US006706154B1

(12) United States Patent
Yang et al.

(10) Patent No.: US 6,706,154 B1
(45) Date of Patent: Mar. 16, 2004

(54) METHOD FOR FABRICATING INTEGRATED OPTICAL COMPONENTS USING ULTRAVIOLET LASER TECHNIQUES

(75) Inventors: Wei Yang, Fremont, CA (US); Li Chen, Fremont, CA (US)

(73) Assignee: Bayspec, Inc., Fremont, CA (US)

( * ) Notice: Subject to any disclaimer, the term of this patent is extended or adjusted under 35 U.S.C. 154(b) by 82 days.

(21) Appl. No.: 09/975,117

(22) Filed: Oct. 10, 2001

Related U.S. Application Data (60) Provisional application No. 60/274,412, filed on Mar. 9, 2001.

(51) Int. Cl.[7] .................. C07C 6/00; C03B 37/022; C03B 37/018; C03B 37/01
(52) U.S. Cl. .............. 204/157.15; 65/386; 65/392; 65/403; 65/425
(58) Field of Search ............... 204/157.15; 65/386, 65/392, 394, 399, 403, 425, 441

(56) References Cited

U.S. PATENT DOCUMENTS

| | | | |
|---|---|---|---|
| 4,162,123 A | 7/1979 | Isono | 354/25 |
| 4,184,968 A | 1/1980 | Stauffer | 250/201 |
| 4,329,577 A | 5/1982 | Asano et al. | 250/201 |
| 4,615,621 A | 10/1986 | Allen et al. | 356/399 |
| 5,178,978 A * | 1/1993 | Zanoni et al. | 430/11 |
| 5,763,340 A * | 6/1998 | Nishii et al. | 501/36 |
| 5,764,829 A * | 6/1998 | Judkins et al. | 385/37 |
| 6,222,953 B1 * | 4/2001 | Hoekstra et al. | 385/16 |

OTHER PUBLICATIONS

William K. Burns & Fenner Milton, "Mode Conversion in Planar–Dielectric Separating Waveguides," Jan. 1975, pp. 32–29, *IEEE Journal of Quantum Electronics*, vol. QE–11, No. 1.

G.J.M. Krijnen, H.J.W.M. Hoekstra, P.B. Lambeck & T.J.M.A. Popma, "Simple Analytical Description of Performance of Y–Junctions," Oct. 22, 1992, pp. 2072–2074, *Electronic Letters*, vol. 28, No. 22.

M.K. Smit, "New Focusing and Dispersive Planar Component Based on an Optical Phased Array," Mar. 31, 1988, pp. 385–386, *Electronic Letters*, vol. 24, No. 7.

M.B.J. Diemeer, J.J. Brons & E.S. Trommel, "Polymeric Optical Waveguide Switch Using the Thermooptic Effect," Mar. 1989, pp. 449–453, *Journal of Lightwave Technology*, vol. 7, No. 3.

(List continued on next page.)

*Primary Examiner*—Edna Wong
(74) *Attorney, Agent, or Firm*—Justin Boyce; Dechert LLP (57) ABSTRACT

A process for forming an integrated optical device in a substrate, comprising the steps of: providing a substrate having a base index of refraction; providing a UV light beam; focusing the beam on a portion of the substrate in order to form a region of increased refraction; and scanning an elongated region of the glass substrate with the beam in order to define at least one elongated optical channel having an increased index of refraction relative to the base index of refraction, the elongated optical channel for guiding light transmitted there along. The process further includes: forming a plurality of elongated optical channels in the substrate, wherein a first optical channel is operative for transmitting light to the plurality of elongated optical channels such that the transmitted light is divided among the plurality of elongated optical channels, thereby forming an optical beamsplitter.

23 Claims, 8 Drawing Sheets

OTHER PUBLICATIONS

H. Takahashi, S. Suzuki, K. Kato & I. Nishi, "Arrayed--Waveguide Grating for Wavelength Division Multi/Demultiplexer with Nonometer Resolution," Jan. 18, 1990, pp. 87–88, *Electronic Letters*, vol. 26, No. 2.

C. Dragone, C.A. Edwards & R.C. Kistler, "Integrated Optics N x N Multiplexer on Silicon," Oct. 1991, pp. 896–899, *IEEE Photonics Technology Letters*, vol. 3, No. 10.

B. Poulellec, P. Niay, M. Douay & J.F. Bayon, "The UV–Induced Refractive Index Grating in Ge:SiO$_2$ Preforms: Additional CW Experiments and the Macroscopic Origin of the Change in Index," 1996, pp. 1842–1856, *IOP Publishing Ltd.*, no month.

K. Okamoto, K. Syuto, H. Takahashi & Y. Ohmori, "Fabrication of 128–Channel Arrayed–Waveguide Grating Multiplexer with 25 GHz Channel Spacing," Aug. 1, 1996, pp. 1474–1476, vol. 32, No. 16.

* cited by examiner

METHOD FOR FABRICATING INTEGRATED OPTICAL COMPONENTS USING ULTRAVIOLET LASER TECHNIQUES

REFERENCE TO EARLIER APPLICATIONS

Reference is made and priority claimed to U.S. Provisional Application Serial No. 60/274,412, filed Mar. 9, 2001, entitled "Method and Apparatus of Fabricating Integrated Optical Components Using Ultraviolet Laser Techniques".

BACKGROUND OF THE INVENTION

1. Field of the Invention

The present invention relates generally to the manufacture of integrated optical devices (IOCS) for use in optical communications networks and optical computing devices, and more particularly to a method for manufacturing integrated optical devices on a planar substrate using ultraviolet light.

2. Description of the Prior Art

The explosive growth of telecommunication and computer communications, especially in the area of the Internet, has created a dramatic increase in the volume of worldwide data traffic which has caused an increasing demand for communication networks providing increased bandwidth. To meet this demand, fiber optic communication systems have been developed to harness the enormous usable bandwidth (tens of tera-Hertz) of a single optical fiber transmission link.

Because it is not possible to exploit all of the bandwidth of an optical fiber using a single high capacity channel, wavelength division-multiplexing (WDM) fiber optic systems have been developed to provide transmission of multicarrier signals over a single optical fiber thereby channelizing the bandwidth of the fiber. In accordance with WDM technology, a plurality of superimposed concurrent signals are transmitted on a single fiber, each signal having a different wavelength. WDM technology takes advantage of the relative ease of signal manipulation in the wavelength, or optical frequency domain as opposed to the time domain. In WDM networks, optical transmitters and receivers are tuned to transmit and receive on a specific wavelength, and many signals operating on distinct wavelengths share a single fiber.

Wavelength multiplexing devices are commonly used in fiber optic communication systems to generate a single multi-carrier main communication signal stream in response to a plurality of concurrent signals having different wavelengths, for transmission via a single fiber. Wavelength demultiplexing devices are commonly used to separate the composite wavelength signal into the several original signals having different wavelengths.

The transmission capacity of an optical network is proportional to the number of channels carried by the main communication signal stream in the optical network. Dense wavelength division multiplexing (DWDM) systems provide many channels with narrowly spaced wavelength separations, such as 50 or 100 GHz channel spacing which corresponds to a wavelength separation of 0.4 nm and 0.8 nm respectively. The number of channels deployed in WDM optical networks is continually increasing. Currently, it is common for WDM optical networks to deploy 16, 32, and 40 channels. DWDM systems providing very large number of channels (e.g., 80 and 160 channels) are likely to be deployed in the foreseeable future.

In optical networks having a large number of channels, a great number of different types of optical components are used to manipulate optical signals. For example, various optical components are used to generate, transmit, stabilize, attenuate, amplify, switch, combine or receive optical signals. There has been a high demand for many optical network components for the last several years and demand continues to exceed supply. One reason for the lack of availability of many optical components is that many of today's component technologies are based on discrete or 'bulk' component technologies. Discrete optical components are bulky, and are either hard to manufacture or difficult to install, or both. Discrete components cannot integrate multiple functions in a single package.

Most of these traditional optical components are either manufactured with high labor costs, or have low manufacturing yields that are typically lower than 50%. Moreover, automated manufacturing for these type of components is difficult to achieve, and therefore not widely deployed. The currently used processes rely primarily on manual labor. Some of the manually manufactured discrete components are unable to economically support more than 40 channels or unable to economically support data rates of 10 Gbit/sec. These manually manufactured optical components have high insertion loss or high dispersion, and are unable to support a dynamic wavelength environment, i.e., they are non-tunable. Furthermore, these components cannot support higher levels of component integration.

As the development and expansion of applications for optical networking equipment increases, and as the number of channels deployed in WDM optical networks increases, it becomes necessary to manufacture optical components at lower cost and, more importantly, at a higher level of component function integration.

Integrated Optical Components (IOCs) are optical components that are made in or within optical materials or substrates that can pass light signals. Examples of IOCs include light passages or waveguides for guiding, transmitting, manipulating, or even amplifying light signals. In order to implement the next generation of optical networking systems, it is necessary to be able to reliably manufacture large quantities of IOC's, such as integrated optical couplers, integrated attenuators, integrated waveguides, integrated switches, integrated wavelength lockers, integrated isolators, integrated amplifiers, integrated gratings, integrated polarizers, or integrated components combining two or more functions.

One could compare discrete optical components with individual transistors. It is hard to imagine a modern personal computer containing tens of thousands of individual transistors. Integrated optical components (IOC) act as an optical equivalent to integrated circuits. IOCs will solve most of, if not all, the aforementioned drawbacks in the optical networking applications.

Semiconductor manufacturing processes are not suitable for the manufacture of IOCs. Using such processes to manufacture IOCs would be expensive, difficult to mature, and result in low yields. Furthermore, hundreds of millions of dollars would be required to develop such processes to produce prototype IOCs. Equipment for mass production of Integrated Optical Components based on traditional semiconductor processes would cost billions of dollars.

Figures 1A, 1B:
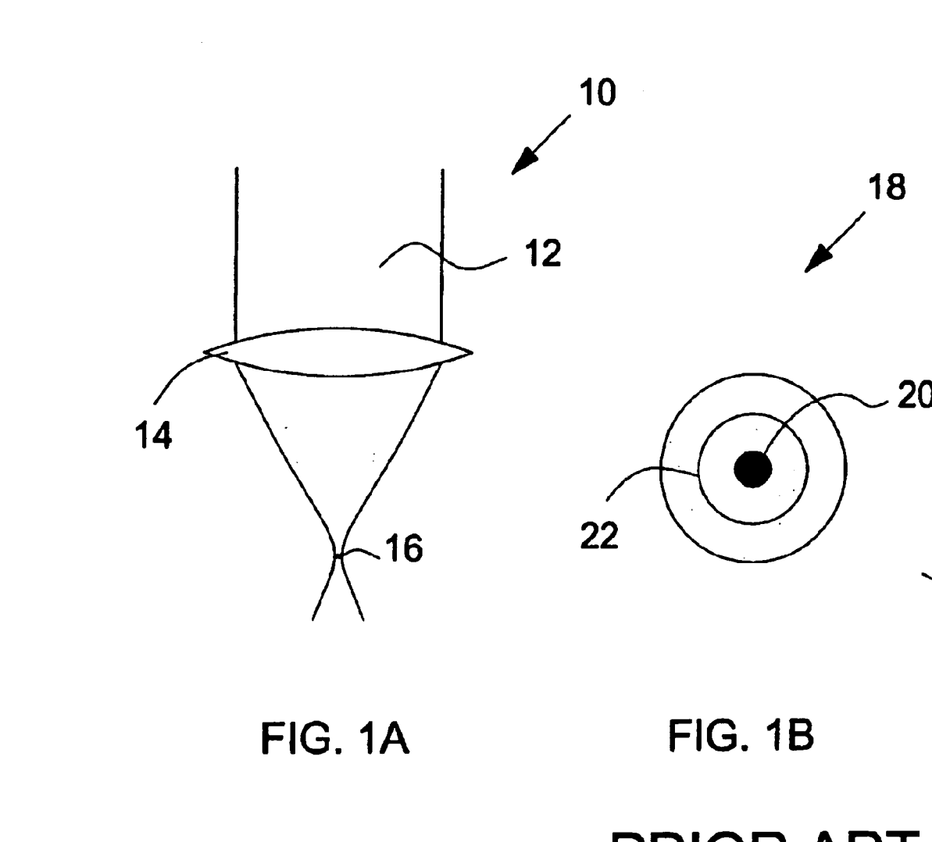
FIG. 1A is a schematic block diagram generally illustrating a prior art method for focusing a deep ultraviolet laser beam onto glass material using a lens in order to increase the refraction index of a region of the glass material proximate a focal point of the lens.
FIG. 1B is a schematic block diagram generally illustrating a top view of the region exposed by deep ultraviolet radiation as illustrated in FIG. 1A.
Figure 1C:
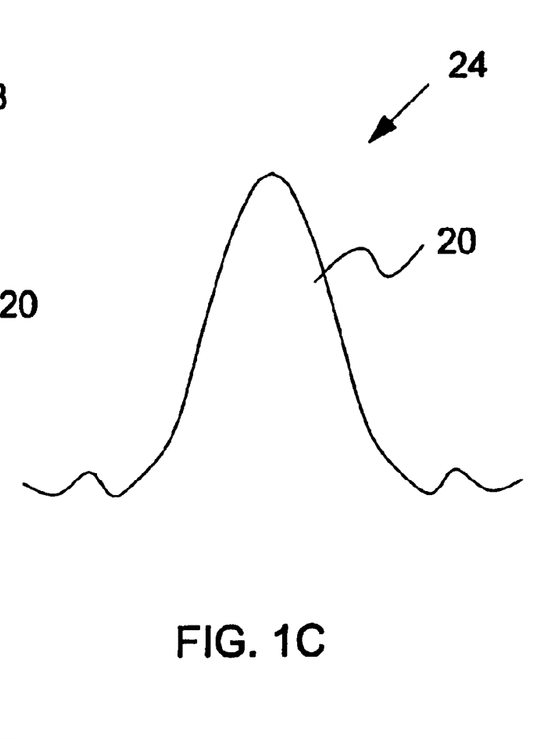
FIG. 1C is a schematic block diagram generally illustrating the refraction index distribution across the region illustrated in FIG. 1B.

It is known that exposing doped glass to intense ultraviolet light can change the refraction properties of the glass. FIGS. 1A through 1C illustrate the effects of exposing an area of a doped glass to intense ultraviolet light. FIG. 1A shows a prior art method at 10 for focusing a deep ultraviolet laser beam 12 onto glass material (not shown) via a lens 14 in order to increase the refraction index of a portion of the glass material disposed beneath a focal point 16. The refraction index of optical glass can be permanently affected by exposure to light of a selected wavelength and intensity, depending on the specific composition of the glass. The size of the focal point 16 is dependent on the size of the area illuminated by laser light, the focal length of the lens 14 and the wavelength of the laser beam. The use of a shorter wavelength laser beam 12 results in a smaller focal point 16. A well designed lens system and a deep ultraviolet laser source, such as a commercially available 248 nm or 193 nm wavelength excimer laser, could be used to produce a spot size of 0.25 μm or even 0.18 μm.

FIG. 1B shows a top view of a region of glass material at 18 exposed to deep ultraviolet radiation disposed beneath the focal spot. A center portion 20 of the exposed region receives the highest intensity ultraviolet radiation, while a first perimeter portion 22 receives a lower intensity of radiation from the laser beam 12 (FIG. 1).

FIG. 1C shows the refraction index distribution at 24 across the exposed glass region 18 (FIG. 1B). As shown the refraction index of the center portion 20 of the exposed region is greatly increased over the refraction index of the surrounding glass.

What is needed is an inexpensive process for fabricating integrated optical components, each having many different functions in a single component.

What is also needed is a process for fabricating integrated optical components with low insertion loss and good device flexibility that is suitable for automated manufacture and large volume of production.

Further needed is a process for fabricating integrated optical components that requires fewer manufacturing steps and less equipment.

SUMMARY OF THE INVENTION

It is therefore an object of the present invention to provide an inexpensive process for fabricating integrated optical components, each having many different functions in a single component.

Another object of the present invention to provide a process for fabricating integrated optical components with low insertion loss and good device flexibility that is suitable for automated manufacture and large volume of production.

Yet another object of the present invention is to provide a process for fabricating integrated optical components that requires fewer manufacturing steps and less equipment.

Briefly, a presently preferred embodiment of the present invention provides a process for forming an integrated optical device in a glass substrate, including the steps of: providing a glass substrate having a base index of refraction; providing a UV light beam; focusing the beam onto a portion of the glass substrate in order to form a region of increased refraction; and scanning an elongated region of the glass substrate with the beam in order to define at least one elongated optical channel having an increased index of refraction relative to the base index of refraction, the elongated optical channel for guiding light transmitted there along.

The process further includes a step of forming a plurality of elongated optical channels in the glass substrate, wherein a first optical channel guides light toward the plurality of elongated optical channels such that the guided light is divided among the plurality of elongated optical channels, thereby forming an optical beamsplitter.

An important advantage of the method of the present invention is that it provides the capability to manufacture integrated optical components at lower cost and higher repeatability, and allows the manufacturing of components with greater functional integration than prior art methods.

The forgoing and other objects, features, and advantages of the present invention will be apparent from the following detailed description of the preferred embodiment which makes reference to the several figures of the drawing.

DETAILED DESCRIPTION OF THE PREFERRED EMBODIMENTS

Figure 2:
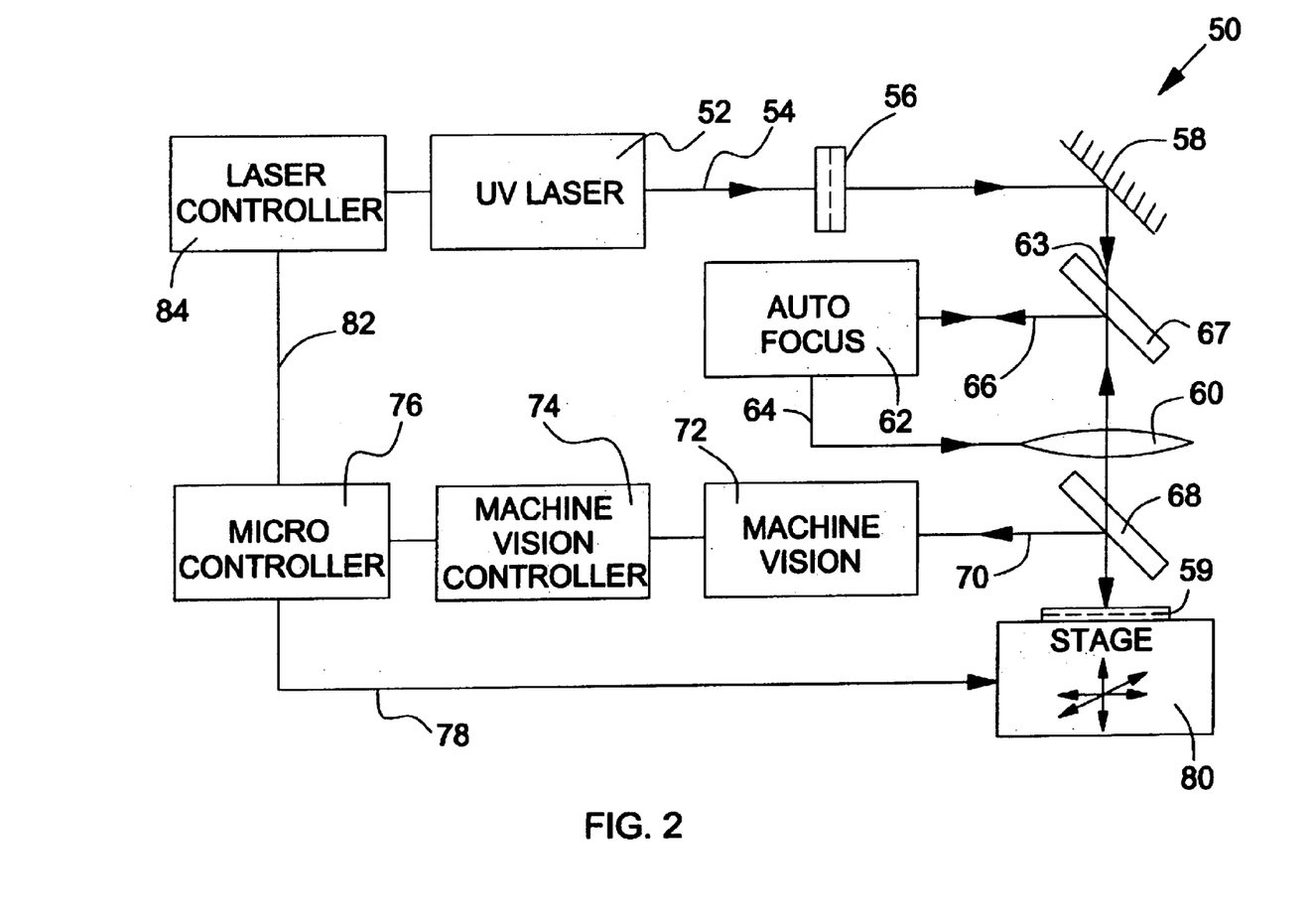
FIG. 2 is a schematic block diagram generally illustrating a device for fabricating integrated optical components in accordance with the present invention.

FIG. 2 is a schematic block diagram generally illustrating a device at 50 for fabricating integrated optical components in accordance with one embodiment of the present invention. The device 50 is operative to perform a process for forming optical channels in a glass substrate. The device 50 includes: a UB laser 52 for emitting a laser beam 54; a laser shutter 56 for selectively blocking the laser beam; a mirror 58 for redirecting the laser beam toward a glass substrate 59; focusing optics 60 for focusing the redirected laser beam 63 onto the glass substrate such that the refraction index of a least a portion of the glass substrate is substantially increased; an auto-focusing unit 62 operative to control the focusing optics 60; and a motorized stage 80 for moving the glass substrate relative to the redirected laser beam 63 such that channels having an increased refraction index are formed in the glass substrate, wherein the channels are capable of carrying optical signals.

The UV laser 52 emits a UV laser beam 54 having a wavelength between 150 nm–300 nm. The UV laser 52 is preferably an excimer laser with a wavelength of approximately 248 nm.

The laser beam 54 passes through the shutter 56, which is operative to selectively block the laser beam for safety and any other operational concerns. The laser beam 54 is then redirected by the mirror 58 toward the glass substrate 59. The mirror 58 is preferably a reflective surface having high reflectivity in the UV wavelength range.

The device 50 further includes an auto-focusing unit 62 for controlling the focusing optics 60, wherein a control link is illustrated by a line 64. Autofocus unit 62 emits a red laser light 66 toward a first beamsplitter 67. Beam splitter 67 allows UV laser beam 63 to pass with greater than 98% transmittance while redirecting auto-focus beam 66 toward the glass substrate 59 with greater than 98% reflectivity. The UV laser beam 63 and auto-focusing beam 66 are focused by focusing optics 60. The auto-focus beam 66 and the UV laser beam 63 follow the same path to the substrate 59 from the beam splitter 67. A portion of the auto-focus beam reflects off of the substrate 59, back through focusing optics 60 to beam splitter 67, where it is redirected back to the auto-focusing unit 62. Opto-detectors (not shown) within the auto-focusing unit 62 receive the reflected auto-focus beam. The auto-focus unit is operative to control the focusing optics 60 in response to the reflected auto-focusing beam 66. The first beam splitter 67 is able to pass the UV wavelengths in high transmission efficiency and reflect some other wavelength with high efficiency, for example, first beam splitter 67 can be a filter that passes 248 nm wavelength laser light with greater than 98% transmittance and simultaneously reflects 675 nm laser light (a popular diode laser wavelength) with a reflectivity of 98%.

In an exemplary embodiment, the auto focus unit 62 contains a diode laser (not shown), optics (not shown) and photodetectors (not shown). Red wavelength (675 nm) laser light is used because it is visible to the human eye for easy alignment and is widely availability. There are many patents describing the use of lasers to carry out auto focusing tasks. Such techniques are widely used in the analytical instrumentation and hard disk industry. The following patents are hereby incorporated by reference: Stauffer (U.S. Pat. No. 4,184,968); Isono (U.S. Pat. No. 4,162,123); Allen. et al. (U.S. Pat. No. 4,615,621); and Asano, et al. (U.S. Pat. No. 4,329,577). The function of auto-focusing unit 62 is to maintain the focal position of the redirected laser beam 63 on the glass substrate.

The redirected UV laser beam 63 is focused on the glass substrate by the focusing optics 60 such the index of refraction of a portion of the glass substrate 59 proximate the focal point (not shown) of the laser beam is substantially increased relative to the base index of refraction of the surrounding glass. The focusing optics 60 may include a multi-element lens system, a reflective system or combination of both.

A machine vision unit 72 emits a light beam 70 toward the second beam splitter 68, which diverts a portion of light beam 70 toward the substrate 59. A portion of light beam 70 is reflected off of the glass substrate back to beamsplitter 68. The beamsplitter 68 redirects the light beam to machine vision unit 72 while passing laser light 66 propagating toward the glass substrate 59. The machine vision unit 72 is responsive to the reflected laser light 70 and operative to provide a signal to a machine vision controller 74

In accordance with one embodiment, the machine vision unit 72 includes focusing optics and a UV sensor array or camera. Additionally, the machine vision unit 72 may include an embedded microprocessor.

The machine vision controller 74 provides a signal to a micro controller 76 indicating the precise location of the glass substrate 59. The machine vision controller 74 provides a work piece position control signal 78 to the stage 80, and a beam feedback signal 82 to the laser controller 84. The laser controller 84 is operative to control the UV laser 52 in order to alter aspects of the laser beam 54 such as beam width and intensity in response to the beam feedback signal 82.

In accordance with one embodiment the machine vision unit 72 generates a digitized video image via a CCD type camera (not shown) in conjunction with an optics system (not shown). Once processed this image will assist the system in coordinating the work piece and its positioning during the fabrication process.

The stage 80 supports the glass substrate and precisely positions the glass substrate in the X, Y and Z planes in response to the work piece position control signal 78. The stage 80 is preferably a precision computer controlled motorized platform capable of X-Y-Z movement with sub-micron positioning resolution. Stages with the aforementioned capabilities are commercially available in the semiconductor industry.

In an exemplary embodiment, the stage 80 secures the glass substrate with a vacuum chuck (not shown) in order to provide low mechanical stress and easy handling. The glass substrate may be placed on the stage 80 with a robotic arm such as those used widely in the semiconductor equipment industry. In one embodiment, the stage 80 provides feedback to the micro controller 76. In one embodiment, the stage 80 includes a programmable microprocessor capable of storing information indicating a predetermined path of movement in order to produce predefined integrated optical components on the glass substrate.

Figure 3A:
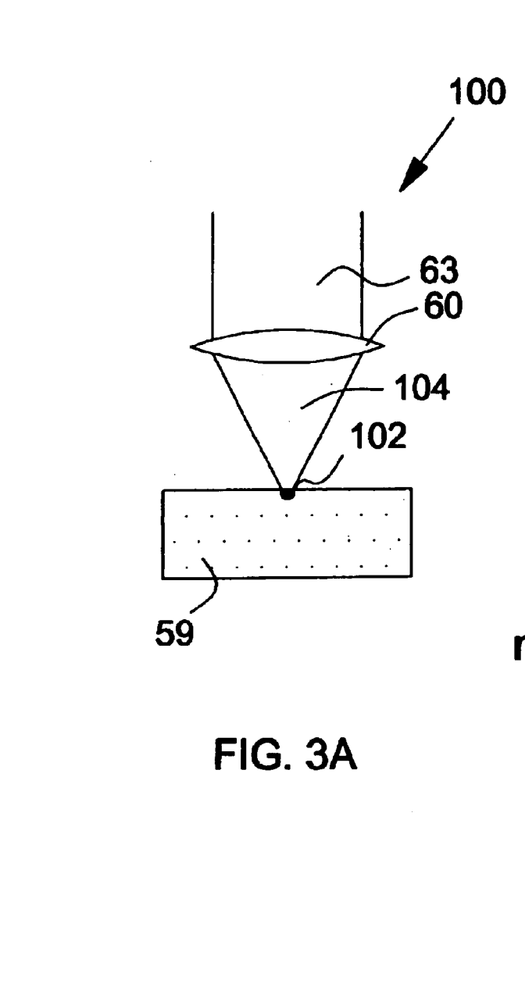
FIG. 3A is a schematic block diagram generally illustrating the focusing of a UV laser on a glass substrate in accordance with one embodiment of the present invention as performed by the device illustrated in FIG. 2.
Figure 3B:
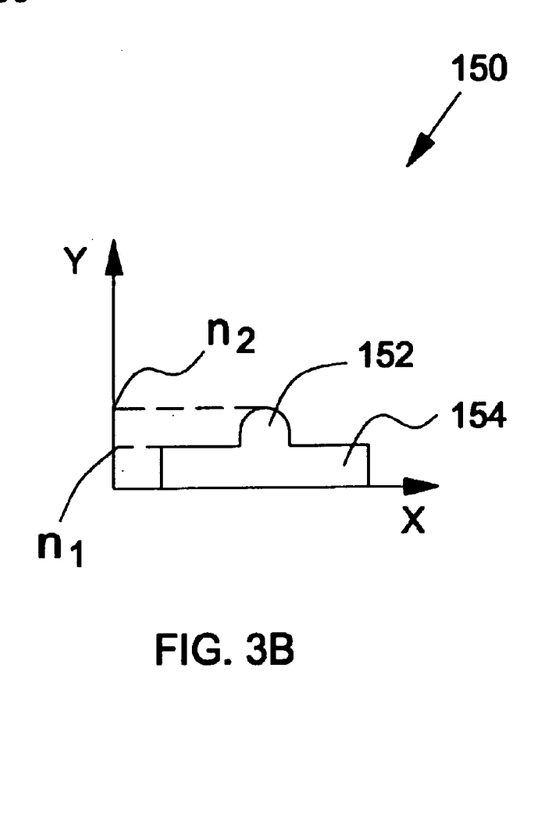
FIG. 3B is a plot diagram generally illustrating the distribution of the index of refraction across an area of the glass substrate, a portion of which has been illuminated by a UV laser in accordance with the present invention.
Figure 3C:
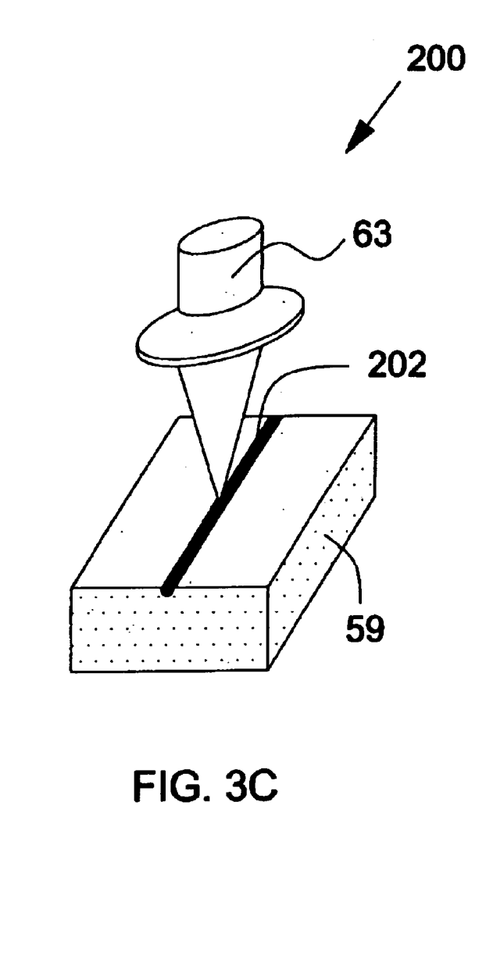
FIG. 3C is a schematic block diagram generally illustrating a scanning process for forming an elongated channel of increased refraction in accordance with the present invention.

FIGS. 3A–3C generally illustrate a process for forming an elongated region of increased refraction on a doped glass substrate using a UV laser, the elongated region forming an optical channel for propagating light transmitted there along in accordance with the present invention. FIG. 3A shows a schematic block diagram generally illustrating the focusing of a UV laser on a doped glass substrate at 100 in accordance with one embodiment of the present invention as performed by the device 50 (FIG. 2). A UV laser beam 63 is focused by focusing optics 60 to a focal point 102 on the surface of a doped glass substrate 59. The focusing optics 60 can be either made from UV transmitting glass or a catadioptric (lens and mirror combinations) optical imaging system. The means of making the lens and catadioptric systems are well known in the art.

In accordance with one embodiment, the doped glass substrate 59 includes a glass that is highly transparent in the preferred working wavelength, for example, 1530–1562 nm for typical fiber optic communications. In accordance with one embodiment, the glass substrate 59 has a flat surface and is doped with a small amount of germanium (Ge), and possibly other co-dopants such as tin (Sn) or boron (B), or any other appropriate dopant.

This process is based on the photosensitivity of optical glass, which allows for permanent change in the refraction index of glass exposed to light with characteristic wavelengths and intensity that depend on the glass material. Photosensitivity has been observed through photoexcitation at different UB wavelengths in a wide variety of different glass materials. Some of these materials include dopants. This glass photosensitivity phenomena is described in an article by B. Poumellec et al. entitled "The UV-induced refraction index grating in Ge: SiO2 preforms: additional CW experiments and the microscopic origin of change in index," Journal of Physics D: Applied Physics, Vol. 29, 1996, pp. 1842–1856, which is hereby incorporated by reference.

The UV energy of laser beam 104 is concentrated at the focal point 102. The UV energy, which is provided by either a pulse or continuous wave laser, illuminates the substrate 59 for a short period of time, which depends on the laser power and doping concentration. The required illumination time can be determined by experimentation. This energy will induce a photosensitivity process within a portion of the substrate 59 whether the substrate is doped or not. The focusing of the UV light will induce a change in the refraction index in a portion of the glass substrate 59 proximate the focal point 102.

FIG. 3B shows a plot diagram generally illustrating the distribution of the refraction index across an area of the glass substrate at 150. A region 152 of the substrate has been illuminated by a UV laser in accordance with the present invention. The refraction index is plotted on the Y axis as a function of position on the glass substrate which is represented along the X axis. The refraction index of the illuminated region 152 will be changed to $n_2$ after some period of UV exposure, dependent on the intensity of UV light, wavelength and dopants on the substrate 59. The value of $n_2$ will be higher than the base index of refraction $n_1$ of the un-illuminated portion 154 of the glass substrate. In most materials suitable for forming the substrate, $n_2$ will be somewhat larger than $n_1$ as a result of the photosensitive process. The difference between the two indices, $n_2-n_1$, is an indicator of the light confining capability and numerical aperture which has been widely discussed in the above referenced article.

It should be noted that the refraction index profile of the illuminated portion 152 is curved and not squared. This is due to the curved gradiation of the laser intensity profile. Typically the intensity gradient of laser energy is Gaussian or super Gaussian in shape.

FIG. 3C shows a schematic block diagram illustrating a scanning process at 200 for forming an elongated region of increased refraction in accordance with one embodiment of the present invention. The laser beam 63 is scanned across the surface of the glass substrate 59 at a slow speed and in a controlled manner. The laser beam 63 is moved horizontally with respect to the planar surface of the substrate while the vertical focal position is maintained relative to the substrate surface. The laser continuously emits UV laser energy in order to form a continuous channel 202 of increased refraction on the substrate 59. In order to form such a channel, the amount of laser energy irradiating each portion of the channel 202 must be high enough to induce the photosensitive process throughout the channel. The scanning speed must be controlled in order to assure a complete photosensitive transformation throughout the channel 202.

The resulting channel's refraction index profile at a particular cross section is similar to that illustrated in FIG. 3B. Maintaining a substantially constant laser energy dosage over the length of a channel on a glass substrate with substantially uniform material properties will result in a channel 202 with a substantially uniform refraction index profiles at each cross section throughout the length of the channel. The process of scanning the UV laser in a controlled manner to generate this channel may be referred to as UV laser writing.

Light waves projected into the channel 202 will be confined within the channel and propagate through it as a result of a total internal reflection effect. This phenomena is due to the area within the channel 202 having a higher refraction index than that of the unaffected regions of the glass substrate 59, which is a common optical phenomena of light wave propagation such as occurs within an optical fiber or optical waveguide.

Figure 4A:
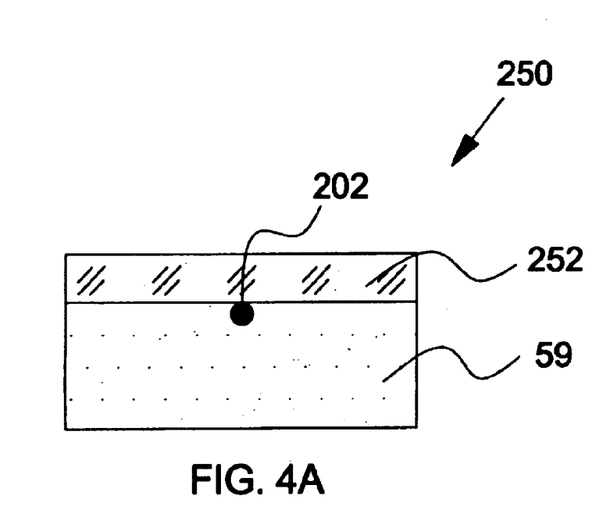
FIG. 4A is a cross-sectional diagram generally illustrating a protective shield layer formed in accordance with one embodiment of the present invention.

FIG. 4A shows a cross sectional view of a channel of increased refraction formed in a glass substrate at 250 having a protective layer of material 252 deposited over the optical channel 202 and glass substrate 59 in order to shield the channel from damage, making the resulting device easier to use and more durable. In one embodiment, the material of the protective layer 252 includes glass with identical optical properties to the glass substrate 59.

The protective layer 252 and substrate 59 may be bonded together using index matching epoxy, or using the direct optical contact method which involves super polishing the optical surfaces and attaching the polished surfaces together with atmospheric pressure. The shielded optical channel is more rugged, easier to handle, easier to clean, and is better protected from moisture and mechanical damage than an unshielded optical channel. Additionally, the device can be coated with metal layers for either protection or mechanical flexibility in packaging. For example, the device can be coated with a thin layer of gold so it may be welded to other devices to improve mechanical integrity or to facilitate subsystem integration.

Figure 4B:
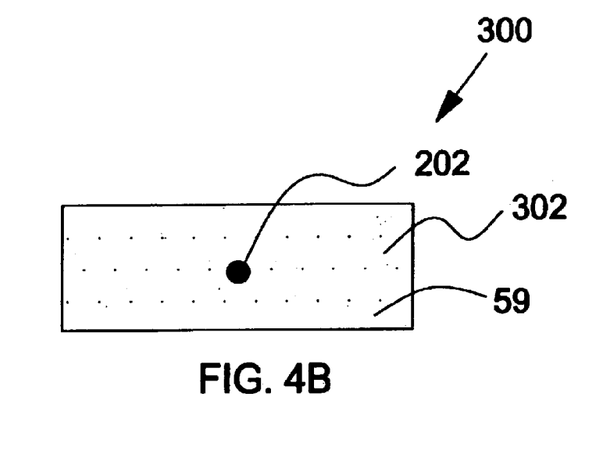
FIG. 4B is a cross-sectional diagram generally illustrating an alternate embodiment of the shield layer illustrated in FIG. 4A.

FIG. 4B shows a diagram generally illustrating an alternative method of shielding an optical channel at 300 in accordance with one embodiment of the present invention. Additional layers of glass material 302, having the same optical properties as the substrate 59 upon which the optical channel was formed, are deposited over the optical channel 202 and the surface of the substrate 59 resulting in the optical channel being encased in glass. Glass material can be deposited by a variety of glass deposition methods such as vapor deposition. A deposition method must be choses with caution in order to prevent damage to the optical channel if the deposition method involves heating the substrate. For example, the change of refraction index may be erased if the glass material is heated to a temperature higher than 250 degrees Celsius.

Figure 5:
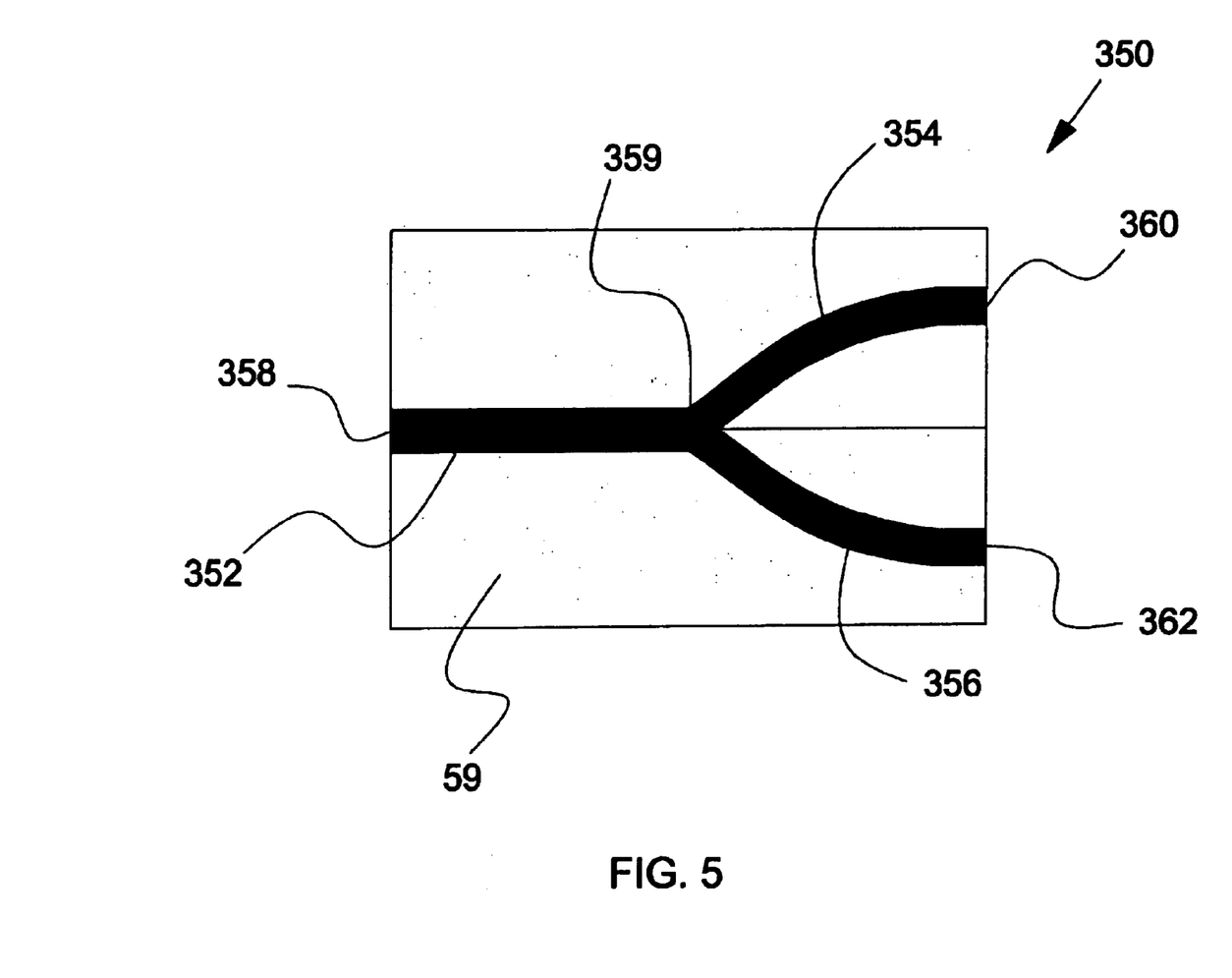
FIG. 5 is a schematic block diagram generally illustrating an optical beam splitter formed by a process in accordance with one embodiment of the present invention.

FIG. 5 shows an optical beam splitter at 350 in accordance with one embodiment of the present invention. The optical beam splitter 350 may be created by forming a first optical channel 352 in a glass substrate 59, a second optical channel 354 branching off of one end of the first optical channel, and a third optical channel 356 branching from the intersection of the first and second optical channels forming a Y-pattern. The above channels may be formed by the laser writing device 50 (FIG. 2).

Light entering the first channel 352 at an input 358 propagates through the first channel to a channel intersection at 359. Assuming that the second and third channels are of equal diameter and have equivalent refraction indexes, half of the light will propagate into and through the second channel 354 and half will propagate through the third channel 356. This method for creating a splitter in accordance with the present invention can be applied for making 1 to n splitter, with n being virtually any integer value.

The splitting ratio of the second and third channels 354 and 356 may be adjusted by controlling the laser beam focal;area size (the area irradiated by the laser beam at any instant) in order to create optical channels with different cross sectional areas. For example, if a split ratio of 90% to 10% is required, the laser beam focal area and corresponding optical channel cross section can be adjusted by manipulating the focusing optics 60 (FIG. 2) and the x-y-z stage 80 (FIG. 2) in order to form a second and third optical channels 354, 356 of varying cross sectional areas. By defocusing the laser beam 63 (FIG. 2), the size of the resulting illuminated area on the substrate 59 will be larger than the area illuminated by an in-focus beam. The beam may be defocused by changing the depth of the focal point 102 (FIG. 3A) relative to the substrate surface, or by moving the stage 80 (FIG. 2) in the z direction, or both. Thus, the channel produced by such a beam will be wider than a channel produced by an in-focus beam. In order to form an intersection having a 90%/10% split, the channels must have a ratio of cross sectional areas of 9 to 1.

The defocused beam has less laser power flounce per unit area than an in-focus beam. In order to compensate for this decrease in power the illumination time must be increased by decreasing the scanning speed of the UV laser beam 63 (FIG. 2). Proper scanning speed can be determined experimentally for a particular glass material. This procedure can be automated by preprogramming the stage 80 (FIG. 2) and focusing optics 60 (FIG. 2) to produce channels of the desired size.

An alternative method for controlling the splitting ratio of the second and third optical channels 354 and 356 is to change the size of the first and second channel output ends 360 and 362 at the edge of the substrate 59. The diameter of the second optical channel 354 can be non-uniform and gradually change to a specific size such as the size of typical single mode fiber at the end 360. The numerical aperture of the channel 354 will be changed but the overall design of the optical channel can be considered and preprogrammed so that the coupling efficiency provides the desired splitting ratio.

Figure 6:
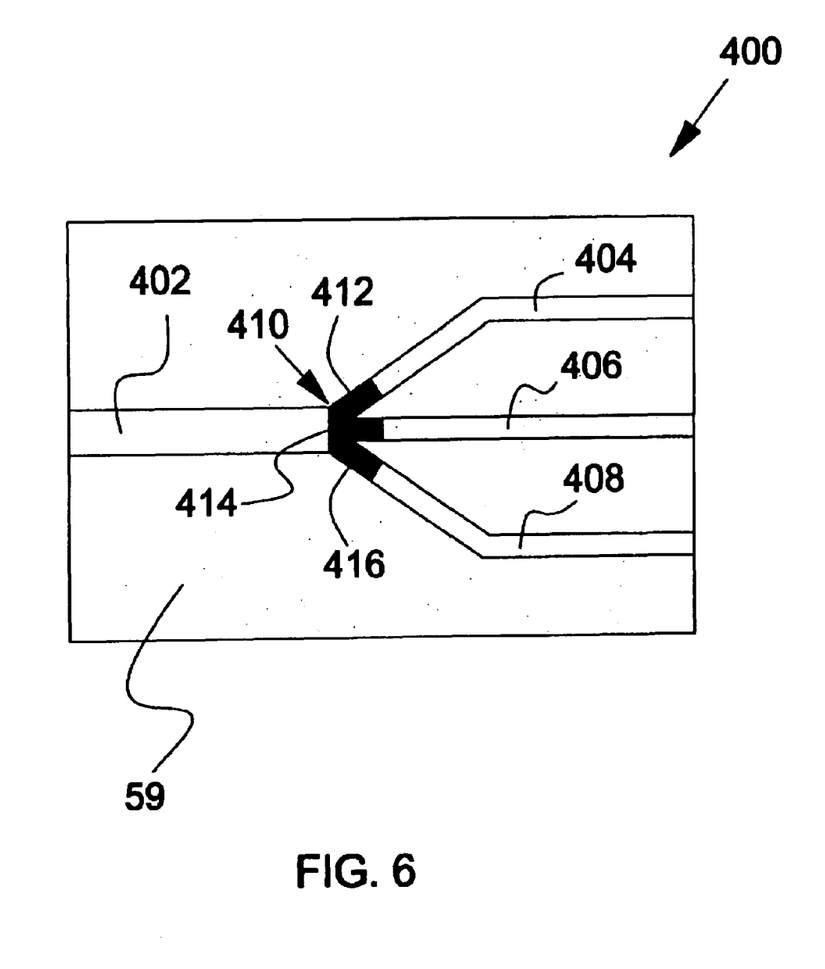
FIG. 6 is a schematic block diagram illustrating an optical switching device manufactured in accordance with one embodiment of the present invention.

FIG. 6 shows a schematic block diagram illustrating an optical switching device at 400 manufactured in accordance with one embodiment of the present invention. The device 400 is constructed in a manner similar to the optical splitter 350 (FIG. 5), with the addition of one or more thermo-optic switches. Thermo-optic switches function by inducing a current across a portion of an optical channel in order to heat the channel, temporarily altering that portion's refraction index relative to other portions of the optical channel, and thereby causing light traveling toward the altered region to reflect back into the channel from which it propagated. This occurs because heating the glass causes an effective difference in the index of refraction between the heated and unheated glass, which is dependent upon the thermo-optic coefficient of the doped glass material of substrate 59.

The implementation of such thermo-optic switches is widely disclosed in various publications, including: W. K. Burns, and A. F. Milton, "Mode conversion in planar-dielectric separating waveguides," IEEE J. Quantum Electronics, 11(1), pp.32–39; G. J. M Krijnen, H. J. W. M. Hoekstra, P. V. Lambeck, and Th. J. A. Proma, "Simple analytical description of the performance of Y-junctions," Electronics Letters, 28(22), pp.2072–2074; M. B. J. Diemeer, J. J. Brons, and E. S. Trommel, "Polymetric optical waveguide switch using the thermooptic effect," J. Lightwave Technology, 5, pp.449–453, 1989. Each of the above identified publications is hereby incorporated by reference.

The device 50 (FIG. 2) is used to form: an input channel 402; and first, second and third output channels 404, 406, 408 on a substrate 59 in accordance with the present invention such that one end of each of the channels intersects at a junction 410. At the junction 410, electrodes are attached across a portion of the first output channel 404 forming a first thermo-optic switch 412. Similarly, second and third thermo-optic switches 414 and 416 are formed across the second and third output channels 406 and 408 respectively.

The resulting structure 400 is operative to propagate light waves along the input channel 402 to the junction 410, and transmit the light through a selected one or more of the output channels 404, 406, 408 by selectively not inducing current in an associated thermo-optic switch 412, 414, 416. Inducing current in a selected thermo-optic switch effectively turns that switch "ON". Turning one of the switches 412, 414, 416 ON causes a contrast in the effective index of refraction between the entrances to the heated and unheated output channels 404, 406, 408, causing a light power shift between the channels. When two or more of the thermo-optic switches 412, 414, 416 are OFF, the device 400 acts as a selectable splitter, splitting inputted light in a manner similar to the splitter 350 (FIG. 5). If all of the thermo-optic switches 412, 414, 416 are ON, the device 400 reflects the light entering the input channel 402 back from the input channel 402.

Figure 7:
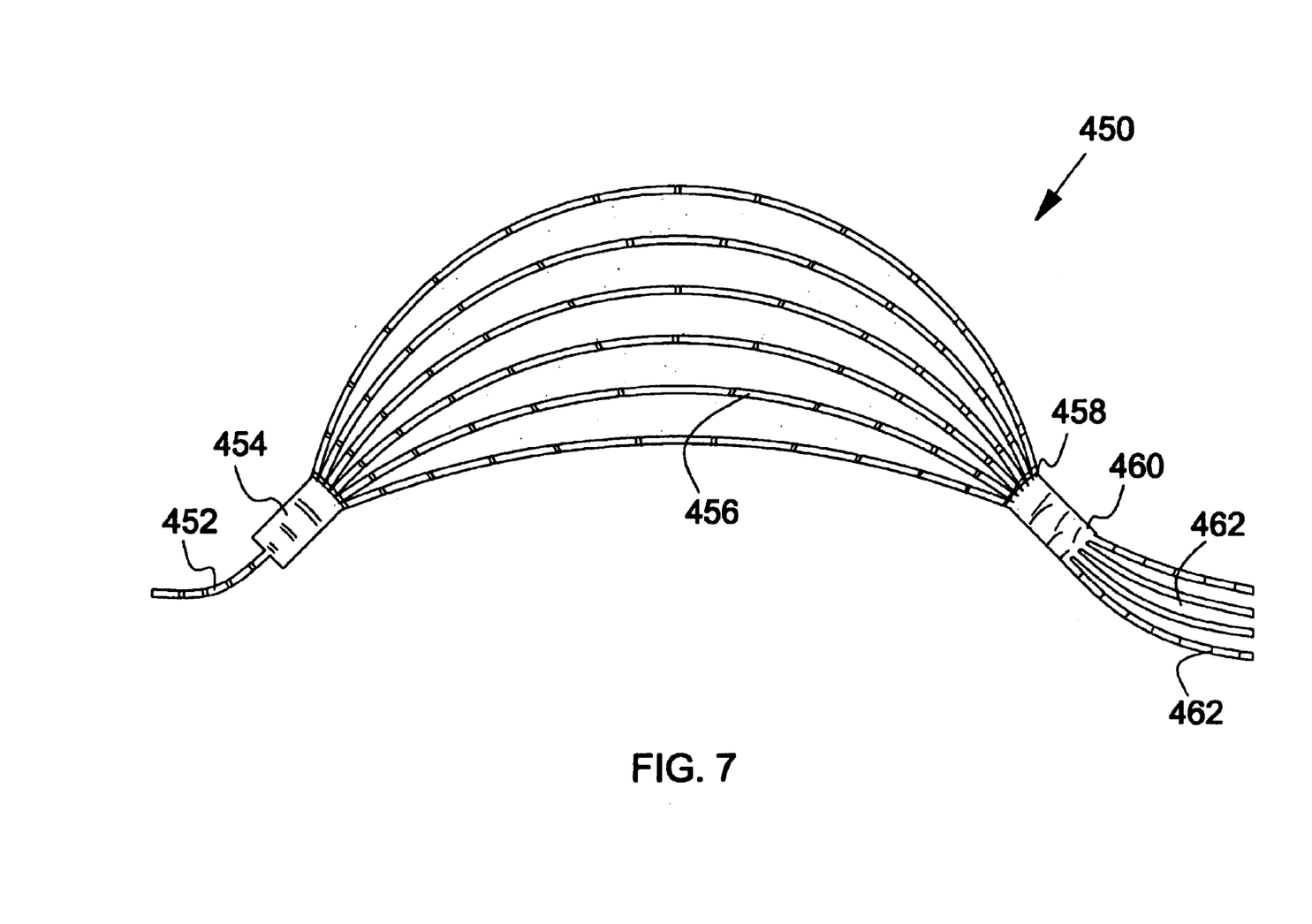
FIG. 7 is a top view generally illustrating an optical wavelength demultiplexer formed in accordance with one embodiment of the present invention.

FIG. 7 illustrates an alternative embodiment of an optical wavelength demultiplexer at 450 in accordance with one embodiment of the present invention. The demultiplexer 450 includes an input optical channel 452 for transmitting multi-wavelength light to a collimating lens region 454 for dividing the light among a plurality of phase separating optical channels 456.

Each of the phase shifting optical channels 456 has a different predefined length which differs from each adjacent channel by a precise length increment such that light emerging from each phase shifting optical channel at a plurality of an associated one of a plurality of junctions 458 has a phase delay incrementally greater than light emerging from a first neighboring channel and a phase delay incrementally less than light emerging from a second neighboring channel. Light entering a second lens region 460 is composed of multiple wavelengths with multiple phase shifts. The second lens region 460 refocuses the light of each wavelength from all the phase shifting optical channels 456 onto a plurality of differing output optical channels 462 such that each output optical channel transmits light of a distinct wavelength. Each of the optical channels discussed above is formed by the process of the present invention.

The function of such a wavelength multiplexer is discussed in several publications, including: M. K. Smit in Electronics letters 24, 385(1988); H. Takahashi, Electronics Letters, 26, 87(1990); C, Dragonne, IEEE Photonics Letters, 3 896(1991); K. Okamoto, et al, Electronics Letters, 32, 1474(1996) and Y. Hida et al, Electronics letters, 36(9), 820(2000). The above referenced publications, however, are fully concentrated on using semiconductor related manufacturing processes. As stated in the above description, the present invention introduces a highly efficient and economically advantageous method of manufacturing those optical channels.

Figure 8:
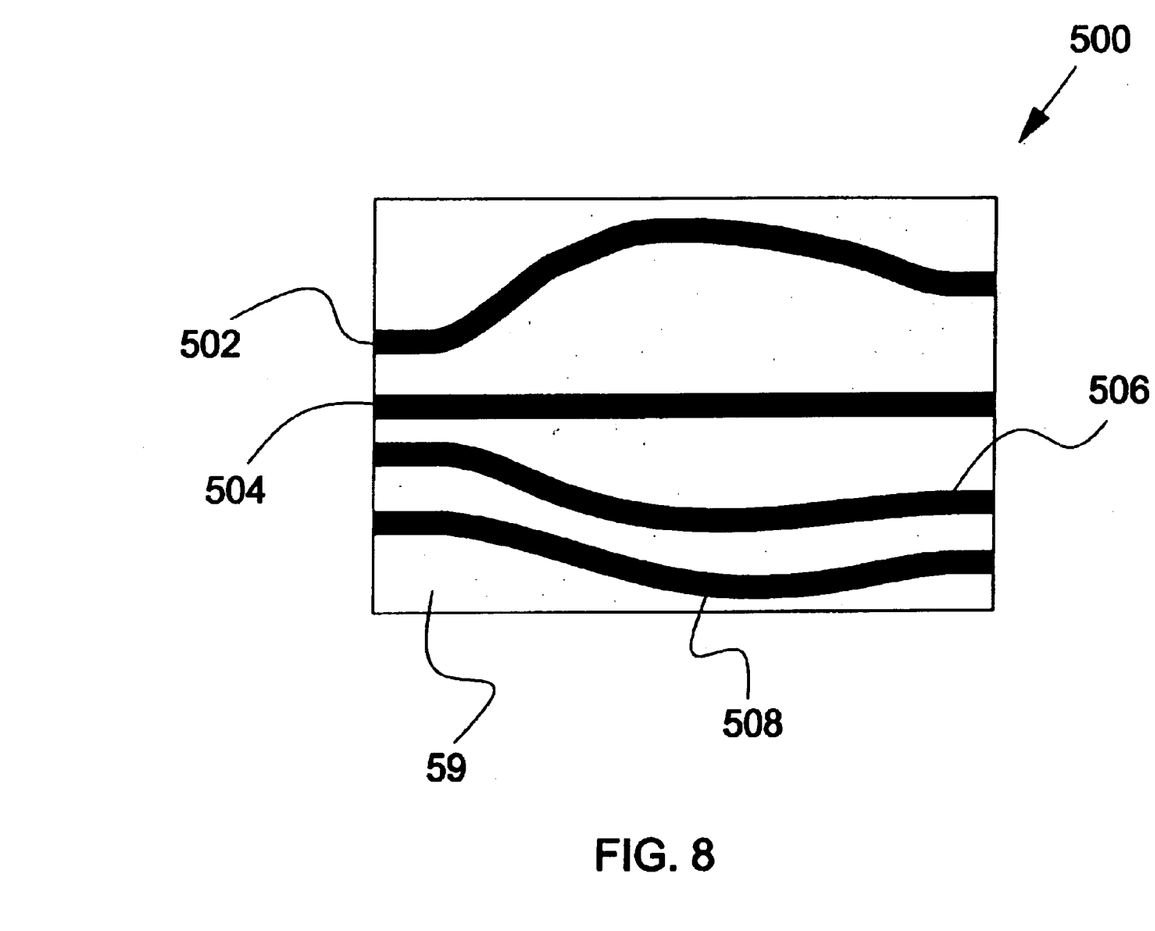
FIG. 8 is a top view generally illustrating an optical signal attenuator fabricated in accordance with one embodiment of the present invention.

FIG. 8 shows an optical signal attenuator at 500 fabricated in accordance with one embodiment of the present invention. A plurality of optical channels 502, 504, 506 and 508 are formed in a glass substrate 59 in accordance with the UV laser writing method illustrated in FIG. 2. The optical channels are formed such that the channel path lengths of each channel is different, for example, the path length of channel 502 is longer than that of channel 504. Since the absorption factor of the substrate material is substantially constant, a longer the path length will result in greater optical attenuation. Because each channel 502, 504, 506, 508 has a different length, the optical attenuation of each channel will be different. Thereby, the optical attenuator 500 may be used to selectively attenuate light by transmitting the light through selected channels having a predefined optical attenuation. An array of many different optical channels with various path lengths can be made, limited only by the size of the glass substrate.

Although the present invention has been described in terms of specific embodiments, it is anticipated that alterations and modifications thereof will no doubt become apparent to those skilled in the art. It is therefore intended that the following claims be interpreted as covering all such alterations and modifications as fall within the true spirit and scope of the invention.

What is claimed is:

1. A process for forming an optical device in a glass substrate, comprising the steps of:
   providing a glass substrate having a surface and a base index of refraction;
   providing a UV light beam;
   focusing said beam to a focal point within the substrate; and
   causing relative motion in three dimensions between said focal point and said substrate so that said focal point of said beam scans a first elongated region of said glass substrate in order to define at least one first elongated optical channel having a cross section defined by an increased index of refraction relative to said base index of refraction, said first elongated optical channel for guiding light transmitted there along, wherein said cross section is determined at least part by a vertical position of said focal point relative to said surface as said beam scans said first elongated region.

2. The process of claim 1, further comprising the step of:
   encasing at least a portion of said first elongated optical channel in a protective material.

3. The process of claim 2, wherein said protective material is glass.

4. The process of claim 2, wherein said protective material is doped glass.

5. The process of claim 4, further comprising the step of forming additional elongated optical channels in said protective glass material in order to form a multi-layered integrated optical device.

6. The process of claim 1, wherein said glass substrate is doped with dopants selected from the group consisting of germanium, tin and boron.

7. The process of claim 1, further comprising the step of forming a plurality of second elongated optical channels in said glass substrate, each of said second elongated optical channels having a corresponding cross section, wherein said first elongated optical channel guides light toward said plurality of elongated optical channels such that said guided light is divided among said plurality of second elongated optical channels, thereby forming an optical beamsplitter.

8. The process of claim 7, wherein said scan results in said second elongated optical channels having approximately equal cross sections, whereby said guided light is divided equally among said plurality of second elongated optical channels.

9. The process of claim 7, further comprising the step of:
   forming at least one thermo-optic switch across at least one of said second elongated optical channels so as to form an optical switching device for switching light transmitted through said first optical channel to a selected one of said second optical channels.

10. The process of claim 1, wherein said light guided by said first optical channel is a multiwavelength light beam, further comprising the steps of:
    providing a beam splitter for splitting said multi-wavelength light beam guided by said first optical channel into a plurality of multi-wavelength light beams;
    forming a plurality of second elongated optical channels in said glass substrate for guiding said plurality of multi-wavelength light beams, wherein each said second elongated optical channel guides a selected one of said plurality of multi-wavelength light beams, wherein each said second elongated optical channel has a different length such that light transmitted there through exits each said second optical channel with a different phase shift; and
    providing a lens region for refocusing said plurality of phase shifted multi-wavelength light beams into a plurality of narrow wavelength light beams of differing wavelengths, thereby forming an optical wavelength demultiplexer.

11. A process of forming an optical device in a glass substrate having a base index of refraction, the substrate having a photosensitivity allowing for inducement of a photosensitive process upon exposure of the substrate to light of a characteristic wavelength, the photosensitive process resulting in changes in the index of refraction of the substrate relative to the base index of refraction, comprising the steps of:
    providing a glass substrate having a surface, and having a base index of refraction;
    generating a light beam suitable for inducing the photosensitive process in said substrate;
    directing said light beam towards said surface of said substrate;
    focusing said light beam to a focal point within the substrate; and
    controlling relative motion in three dimensions between said focal point and said substrate in order to expose each of a plurality of selected regions of said substrate to said light beam, wherein a corresponding photosensitive process is induced in each of said selected regions, each said corresponding photosensitive process being induced by performing the sub-steps of,
    positioning said focal point at a corresponding predetermined depth relative to said surface of said substrate in said corresponding selected region, and
    exposing said corresponding selected region to said beam for a corresponding predetermined exposure time while said focal point is positioned at said corresponding predetermined depth in said corresponding selected region;

wherein each said photosensitive process transforms said corresponding selected region into a corresponding optical channel having a cross sectional area determined at least in part by said corresponding depth.

12. A process as recited in claim 11 wherein said sub-step of positioning said focal point is achieved at least in part by said step of focusing said light beam.

13. A process as recited in claim 11 wherein said sub-step of positioning said focal point includes defocusing said light beam.

14. A process as recited in claim 11 wherein said sub-step of positioning said focal point includes moving said substrate in a vertical direction relative to said focal point of said light beam.

15. A process as recited in claim 11 wherein said step of controlling relative motion further includes:

causing a first relative motion between said substrate and said light beam so that said beam scans along a first elongated region of said substrate, wherein said depth of said focal point relative to said surface is positioned during said first relative motion to define a first optical channel having a first cross sectional area; and causing a second relative motion between said substrate and said light beam so that said beam scans along a second elongated region of said substrate, wherein said depth of said focal point relative to said surface is positioned during said second relative motion to define a second optical channel having a second cross sectional area.

16. A process as recited in claim 15 wherein:

said step of causing a first relative motion further includes exposing said first elongated region of said substrate to said beam for a first predetermined exposure time; and said step of causing a second relative motion further includes exposing said second elongated region of said substrate to said beam for a second predetermined exposure time.

17. A process as recited in claim 15 wherein said step of causing a first relative motion further includes varying said depth of said focal point relative to said surface during said first relative motion, whereby said first optical channel is defined to have a nonuniform cross sectional area.

18. A process as recited in claim 15 wherein said step of controlling relative motion results in said first optical channel branching from said second optical channel.

19. A process as recited in claim 15 wherein said step of controlling relative motion further includes:

causing a third relative motion between said substrate and said light beam so that said beam scans along a third elongated region of said substrate, wherein said depth of said focal point relative to said surface is positioned during said third relative motion to define a third optical channel having a third cross sectional area; and wherein said second and third optical channels branch from said first optical channel to form an optical multiplexer.

20. A process as recited in claim 15, further comprising forming a thermo-optic switch across a portion of said first optical channel.

21. A process as recited in claim 11, wherein:

said step of providing said glass substrate further includes doping said glass substrate with a specified doping concentration; and said step of generating a light beam includes generating a laser light beam having a specified laser power;

whereby said change in said index of refraction of said region of said substrate proximate said focal point is determined at least in part by said laser power and said doping concentration.

22. A process as recited in claim 11, further comprising a step of forming a protective layer over said substrate.

23. A process as recited in claim 11, wherein said relative motion is controlled in accordance with stored information indicating a predetermined path of movement in order to produce a predetermined integrated optical component.

* * * * *